Oct. 6, 1959 W. J. ROONEY 2,907,974
EMERGENCY ELECTRICAL OUTLET DEVICE
Filed June 11, 1957
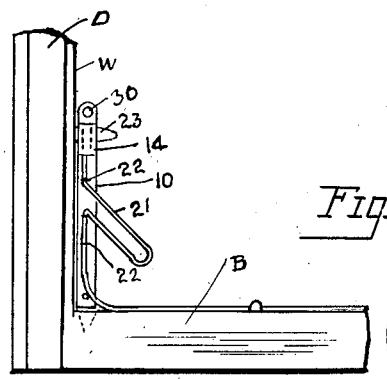
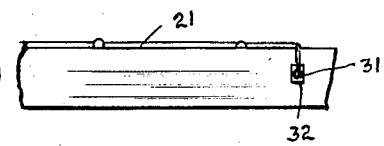
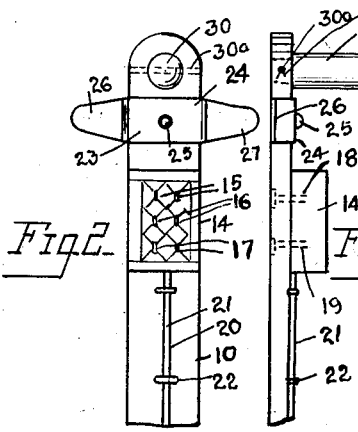
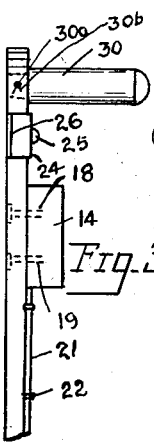
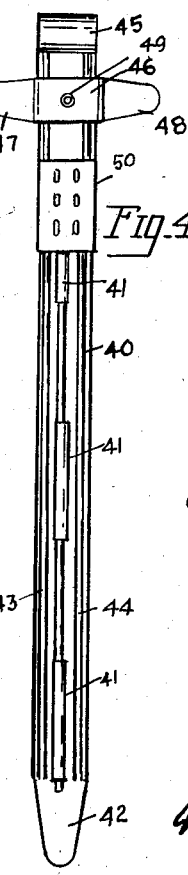
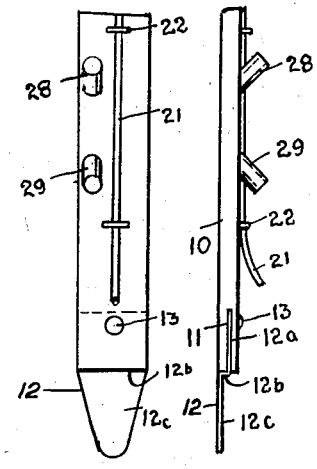
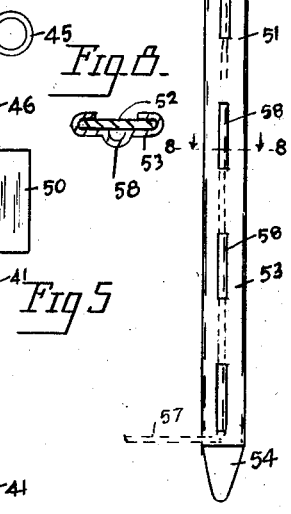
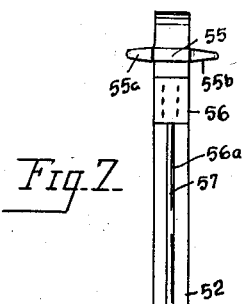
INVENTOR.
William J. Rooney

United States Patent Office 2,907,974
Patented Oct. 6, 1959

2,907,974

EMERGENCY ELECTRICAL OUTLET DEVICE

William J. Rooney, Phillipsburg, N.J.

Application June 11, 1957, Serial No. 665,084

6 Claims. (Cl. 339—125)

This invention relates to an improved electrical outlet device, and one of its objects is to provide an electrical outlet with means for supporting it against a wall, in any part of a room or building, above the level of the base board in which the fixed electrical outlet may be located, and to provide a flexible cord and plug-in connection for the elevated electrical outlet, so that electrical current may be supplied to any local service appliance, motor or device, such as floor sander, vacuum cleaner, portable saw or any other device, and the service cord supported well above the floor level, so as to avoid accidents to persons walking over the floor and to eliminate hazards of fire, arising from bruised cords or broken electrical connections.

Another object of the invention is to provide a support for an electrical outlet, having a thin metal blade which can be forced between the base board and the wall, and another thin metal blade elevated by a supporting post, which can be forced between a door or window frame and the wall, to provide a stable support for the electrical outlet mounted on the post.

A further object of the invention is the provision of a post or support for an electrical outlet, having a base board coupling blade on the lower end thereof and a stop for limiting the penetration of the blade between the base board and the wall, and a blade on the upper end of the post, having insertable end portions projecting on opposite sides of the post or support, either one of which may be driven between a window or door frame and the wall, and which is mounted on the post or support to limit the insertion thereof.

Another object of the invention is to provide a support or post for elevating an electrical outlet above the floor of a room or building, with a retainer for the electrical cord which services the outlet, which can be used to take up slack of the cord, so that no loose cord will be spread over a floor or hall.

With the above and other objects in view, the invention comprises certain new and useful constructions, combinations and arrangements of parts, clearly described in the following specification of the accompanying drawings, in which:

Fig. 1 is a view in elevation of a room showing the installation of the outlet and support, showing a wood post.

Fig. 2 is a front elevation of the supporting post and outlet, on an enlarged scale.

Fig. 3 is a side elevation thereof.

Fig. 4 is a front elevation, showing a formed sheet metal post, in a modified construction.

Fig. 5 is an edge or side view thereof.

Fig. 6 is a detail cross sectional view, taken on line 6—6 of Fig. 5, looking in the direction of the arrows.

Fig. 7 is a front elevation of an extension post for the electrical outlet.

Fig. 8 is a detail cross sectional view thereof, taken on line 8—8 of Fig. 7, looking in the direction of the arrows, and enlarged.

Referring to the accompanying drawings, showing the practical embodiment of my invention, 10 designates a wood post, having a longitudinal slit 11 in its lower end in which the upper end 12a of the metal blade 12 is snugly fitted, and which has the same width as the wood post 10. This metal blade is constructed of stiff steel and is provided with an offset bend 12b, which snugly engages the lower end of the post 10, and with a tapered inserting finger 12c, which can be driven between the base board B and the wall W, as shown in Fig. 1. The blade is permanently secured in the wood post by a fastener 13, which is driven through the lower end of the post and the upper end of the metal blade.

The upper end portion of the post 10 is equipped with an electrical outlet 14, which is shown to be constructed with a plurality of paired slots 15, 16 and 17, to receive separate male connecting prongs of a plug-in connector. This electrical outlet may be a single, double or triple plug-in, and may be of any construction. It is secured to the post by means of screws 18 and 19, driven through the post into taped holes of the body of the outlet 14.

The post 10 is constructed with a central longitudinal groove 20, in which the electrical conductor cord 21 is disposed, and this cord is retained in place in this groove by means of staples or fasteners 22, which bridge the groove 20, and which allow the cord to be pulled into lateral loops between the fasteners, so that slack may be taken up and the cord supported above the floor of installation.

Above the electrical outlet 14 the post 10 is provided with a second blade 23, of thin metal, which is constructed with a central or intermediate U-shaped saddle bend 24, which fits snugly on the post 10, and is secured in place by a single fastener 25. This blade is provided with a lateral tapered finger 26 on one end, which extends a considerable distance to the left of the post 10, and a similar tapered finger 27 on the other end which extends to the right of the post. The left tapered finger 26 is shown, in Fig. 1, to be engaged between the wall W and the door frame D, due to the fact that the door frame is on the left of the post. But when a condition exists when the door or window frame is on the right of the post, the right tapered finger 27 would be engaged with the door or window frame and wall.

To retain an extra long cord on the post, it may be provided with lateral pins 28 and 29, spaced apart, to permit winding of the cord slack on these pins.

The upper end of the wood post 10 may be provided with a round handle 30, having an inner reduced end 30a, tightly driven into a receiving hole of the post, and secured in place by a bonding adhesive and a pin 30b, driven through the post and the reduced inner end of the handle. This handle forms a convenient means for applying pressure to the post, to drive the lower anchoring blade finger behind the base board, and for applying pressure to the post to drive one of the upper lateral fingers between the door or window frame and the wall. This handle also provides means for quickly detaching the post from its wall connections.

The free end of the conductor cord is supplied with a conventional plug-in connector 31, which may be plugged in a remote fixed electrical outlet 32, usually installed in a housing opening formed in the base board or framing of the wall, or other place in the home or building.

In Figs. 4, 5 and 6, I show a sheet metal post construction, which includes a post 40, constructed of strip or thin steel bar stock, having an offset cord guiding stamped series of guide tubes or channels struck from the metal. The offset channel or tube guides 41 are arranged in staggered or spaced apart order in a central row, and the lower end of this post is provided with a tapered finger 42, adapted to be forced between the base board and the wall. This post is also formed with a longitudinal rib 43 on one side and another longitudinal rib 44 on the other side, disposed in parallel relation to each other and parallel to the row of cord guides 41.

The lowermost cord guide 41 forms a stop for limiting the insertion of the tapered end finger 42. The upper end of the sheet metal post is formed with a handle roll 45, so that manual pressure may be applied to the post to force the terminal finger 42 behind the base board, and to forcibly withdraw the same.

The upper end of the post is equipped with a flat metal cross bar 46, having a tapered holding finger 47 on one end and a tapered holding finger 48 on the other end, each of which extends laterally of the post, for the same uses as set forth in reference to the construction shown in Figs. 1 to 3, inclusive. This metal cross bar is attached by welding or by means of the tubular fastener 49, which thereby provides an opening for hanging the device upon a nail or supporting pin when it is not in use.

The post is further provided with an electrical outlet 50, secured thereto, which may be provided with a single plug-in connector, two plug-in connectors or three plug-in connectors.

In this construction the conductor cord may be looped between the channel cord guides 41, so that loose cord will be supported above the floor.

My invention permits of emergency installations in halls, rooms, offices, factories and other places, to provide extra electrical outlets at any desired elevation, the invention not being limited by the length of the post.

To provide for work operations on high ceilings and walls, I show a post 51, constructed of an upper section 52 and a lower section 53. The lower section is formed with a U-shaped cross section and the upper section has a friction sliding fit in this lower section. The lower section is formed with the base board retaining finger 54, and the upper section is provided with the blade 55, secured or welded thereto, having end retaining fingers 55a and 55b. The upper section is provided with an electrical outlet 56, and is formed with a longitudinal groove 56a for the conductor cord 57. The lower section is formed with offset cord retaining guides 58, through which the cord may be extended.

By first securing the lower section between the base board and wall and then securing the upper end of the upper section at the level desired, the adjustable post shown in Figs. 7 and 8 may be employed when interior scaffolding or plank supports are provided.

It is understood that various changes in the details of construction and their combination, may be resorted to, within the scope of the invention, as defined in the claims hereof.

Having described my invention I claim as new and patentable:

1. A post having a metal blade at one end adapted to be inserted between the base board of a room and the adjacent wall thereof and provided at its upper end with a lateral blade adapted to be inserted between the same wall and a building frame against the said wall, and an electrical outlet mounted on the upper end of the post and provided with an extension cord having a terminal plug-in connector.

2. A post having a metal blade mounted on the lower end thereof and formed with an offset engaged by the lower end of the post, a metal blade on the upper end of the post provided with a tapered lateral finger, an electrical outlet mounted on the post and provided with an extension cord to supply electrical current thereto and provided with means for connecting the cord and outlet to an electrical supply outlet, and a handle on the upper end of the post.

3. A post having a wood body and formed with a longitudinal slit in its lower end, a metal blade fitted in and secured in said slit and having an offset bend engaging the end of the post and a tapered finger projecting from said bend to be inserted between the base board and wall of a building, a blade on the upper end of the post having a U-shaped bend which straddles the post and having a lateral tapered finger on each side of the post, either one of said fingers being insertable between the wall of a building and a frame thereof, an electrical outlet mounted on the post, an electrical conductor cord connected with said outlet, and guides on said post through which the electrical cord extends providing means for looping slack portions of said cord on said post.

4. An emergency electrical outlet device, comprising a post having means at one end to secure the post between a base board and its wall and means at the other end to secure the post between the wall and a building frame part adjacent to the wall, an electrical outlet mounted on the upper end of the post and provided with an extension electrical cord having a plug-in connector on its outer end for taping a distant electrical outlet, the post having a plurality of cord retainers spaced longitudinally from each other and the cord being extended through said retainers and being extendable from the retainers to loop the cord and take up slack in the cord.

5. An emergency electrical outlet device, comprising a post having a longitudinal slit in one end thereof, a blade inserted in and secured in said slit and having an offset bend engaging the end of the post and provided with a tapered finger projecting longitudinally from the post for forcible insertion between the base board and a wall to support the post in upright position on the wall, a blade having a U-shaped central saddle mounted thereby on the upper end of the post and providing lateral terminal tapered fingers, each of said fingers being insertable between the wall and a building frame part, said post having a longitudinal groove and a flexible conductor cord disposed in said groove and electrically equipped on one end with a plug-in connector for electrically connecting the cord to a distant source of electrical current, retainers bridging said groove to hold the cord against the post and adapted to permit said cord to be looped from the post to take up slack, and pins located on the post for winding extended loops thereon.

6. An emergency outlet device for electrical service, comprising a post having a metal blade on its lower end adapted to be manually driven between a room wall baseboard and the wall thereof to support the post vertically and provided with metal blade member mounted crosswise of the post and astride the same and provided with oppositely projecting lateral arms adapted to be manually driven between a door frame and the same room wall above stated to support the post against displacement from the wall, the post being provided with an electrical outlet thereon and a flexible cord having one end connected to the outlet and the opposite end thereof provided with a plug-in connector, the post having a handle on its upper end extending laterally thereof and a plurality of lateral pins below the handle on the post projecting in divergent directions from the post to permit of the cord being wound thereon.

References Cited in the file of this patent

UNITED STATES PATENTS

| | | |
|---|---|---|
| 803,819 | Getz | Nov. 7, 1905 |
| 1,895,656 | Gadke | Jan. 31, 1933 |
| 2,261,986 | Frank et al. | Nov. 11, 1941 |
| 2,293,911 | Morten et al. | Aug. 25, 1942 |
| 2,313,212 | Alden | Mar. 9, 1943 |
| 2,534,804 | Tiscione | Dec. 19, 1950 |
| 2,810,895 | Odegaard | Oct. 22, 1957 |